(12) United States Patent
Inada (10) Patent No.: US 11,284,030 B2
(45) Date of Patent: Mar. 22, 2022

(54) IMAGE SENSOR AND CAMERA MODULE INCLUDING THE SAME

(71) Applicant: SAMSUNG ELECTRONICS CO., LTD., Suwon-si (KR)

(72) Inventor: Takahiko Inada, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 47 days.

(21) Appl. No.: 16/941,981

(22) Filed: Jul. 29, 2020

(65) Prior Publication Data

US 2021/0227168 A1 Jul. 22, 2021

(30) Foreign Application Priority Data

Jan. 17, 2020 (KR) .................. 10-2020-0006513

(51) Int. Cl.
*H04N 5/3745* (2011.01)
*H04N 5/378* (2011.01)
*H04N 5/372* (2011.01)
*H04N 5/361* (2011.01)
*H04N 5/376* (2011.01)

(52) U.S. Cl.
CPC ......... *H04N 5/37455* (2013.01); *H04N 5/361* (2013.01); *H04N 5/372* (2013.01); *H04N 5/378* (2013.01); *H04N 5/3765* (2013.01)

(58) Field of Classification Search
CPC .... H04N 5/37455; H04N 5/378; H04N 5/372; H04N 5/361; H04N 5/3765; H04N 5/3577; H04N 5/357; H04N 5/379; H04N 5/3745; H04N 5/2253; H04N 5/2257
See application file for complete search history.

(56) References Cited

U.S. PATENT DOCUMENTS

| 6,593,966 | B1* | 7/2003 | Watanabe | H04N 5/3577 |
| | | | | 348/312 |
| 8,411,183 | B2* | 4/2013 | Kato | H04N 5/361 |
| | | | | 348/302 |
| 9,247,165 | B2 | 1/2016 | Sohn | |
| 2006/0092283 | A1* | 5/2006 | Tanizoe | H04N 5/3595 |
| | | | | 348/207.99 |
| 2009/0244338 | A1* | 10/2009 | Kume | H04N 5/361 |
| | | | | 348/294 |
| 2011/0025874 | A1* | 2/2011 | Tamaoki | H04N 5/365 |
| | | | | 348/222.1 |
| 2011/0115952 | A1* | 5/2011 | Watanabe | H04N 5/361 |
| | | | | 348/243 |
| 2018/0063458 | A1* | 3/2018 | Shida | H04N 5/378 |
| 2019/0182449 | A1 | 6/2019 | Baek | |

FOREIGN PATENT DOCUMENTS

| JP | 2000-151899 A | 5/2000 |
| JP | 2013-106225 A | 5/2013 |
| KR | 10-2016-0137437 A | 11/2016 |

* cited by examiner

*Primary Examiner* — Nhan T Tran
(74) *Attorney, Agent, or Firm* — Lee IP Law, PC (57) ABSTRACT

An image sensor includes a pixel array; a logic circuit configured to convert an image signal generated from the pixel array during a first period into image data; and a memory. The image data may be written in the memory during a second period, of which at least a portion overlaps the first period. The logic circuit may write dummy data in the memory during a third period overlapping the first period and not overlapping the second period.

20 Claims, 8 Drawing Sheets

IMAGE SENSOR AND CAMERA MODULE INCLUDING THE SAME

CROSS-REFERENCE TO RELATED APPLICATION

Korean Patent Application No. 10-2020-0006513, filed on Jan. 17, 2020, in the Korean Intellectual Property Office, and entitled: "Image Sensor and Camera Module Including the Same," is incorporated by reference herein in its entirety.

BACKGROUND

1. Field

Embodiments relate to an image sensor and a camera module including the image sensor.

2. Description of the Related Art

Various electronic devices such as a smartphone, a personal computer (PC), and a digital camcorder may be equipped with an image sensing system for obtaining and processing an image. The image sensing system may include an image sensor or a camera module for converting an external light into an electrical signal to obtain an image. The image sensor may include a pixel array in which pixels are arranged two-dimensionally.

SUMMARY

Embodiments are directed to an image sensor, including: a pixel array; a logic circuit configured to convert an image signal generated from the pixel array during a first period into image data; and a memory. The image data may be written in the memory during a second period, of which at least a portion overlaps the first period. The logic circuit may write dummy data in the memory during a third period overlapping the first period and not overlapping the second period.

Embodiments are also directed to an image sensor, including: a pixel array; and a logic circuit configured to convert an image signal generated from the pixel array into image data during a first period, to output the image data to a memory during a second period at least partially overlapping the first period, and to output dummy data to the memory during a part of the first period that does not overlap the second period.

Embodiments are also directed to a camera module, including: a lens configured to transfer an external light; a pixel array configured to generate an image signal based on the transferred light; a logic circuit configured to convert the image signal into image data during a first period and to output the image data during a second period; and a memory configured to store the output image data during the second period, in a first mode. In the first mode, the logic circuit may output the image data to the memory during the second period, and output dummy data to the memory during a third period overlapping the first period and not overlapping the second period. In a second mode, the logic circuit may output the image data to an outside during the second period.

BRIEF DESCRIPTION OF THE FIGURES

Features will become apparent to those of skill in the art by describing in detail example embodiments with reference to the attached drawings in which.

DETAILED DESCRIPTION

Figure 1:
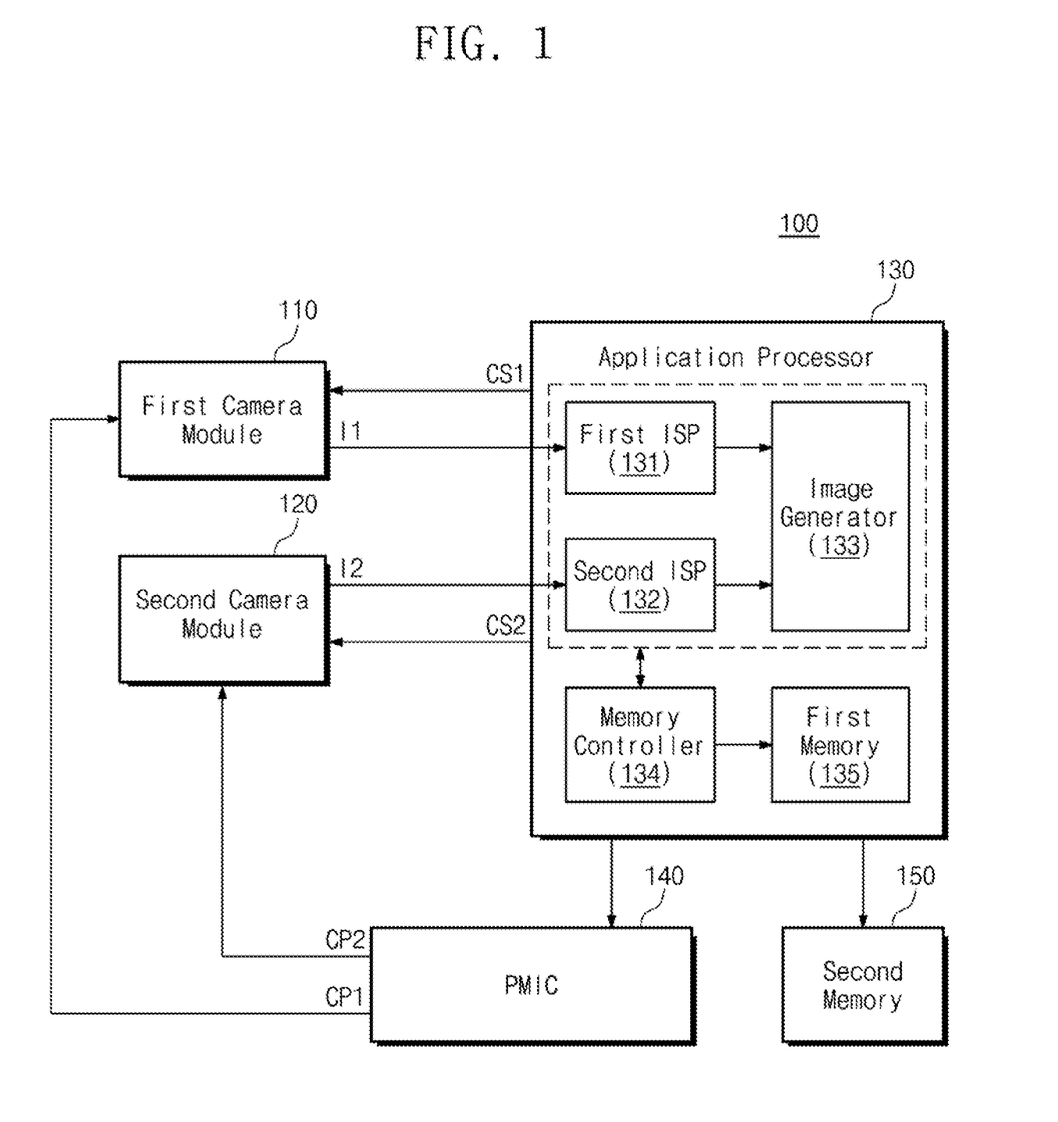
FIG. 1 is a block diagram of an image sensing system according to an example embodiment.

FIG. 1 is a block diagram of an image sensing system according to an example embodiment.

Referring to FIG. 1, an image sensing system 100 may include a first camera module 110, a second camera module 120, an application processor 130, a power management integrated circuit (PMIC) 140, and a system memory (or a second memory) 150. The image sensing system 100 may be implemented in various electronic devices such as a digital camera, a smartphone, a tablet PC, and a wearable device. At least some components of the image sensing system 100 may be implemented with an integrated circuit (IC), a system on chip (SoC), etc.

The first camera module 110 and the second camera module 120 may receive an external light to generate an electrical signal such as an analog signal. The first camera module 110 may be different from the second camera module 120 in at least one of a focal length, a viewing angle, the number of pixels, and a wavelength band of a light to be sensed. For example, the first camera module 110 may be a wide camera module, and the second camera module 120 may be a tele camera module for telephoto or longer focal length. A viewing angle or field of view of the first camera module 110 may be greater than a viewing angle or field of view of the second camera module 120.

The first camera module 110 and the second camera module 120 may convert an image signal that is an analog signal into image data that is a digital signal. For example, the first camera module 110 and the second camera module 120 may perform a correlated double sampling (CDS) operation on the image signal for the purpose of extracting an effective signal component. The image data may be stored in a memory provided within the first camera module 110 and the second camera module 120. The stored or generated image data may be output to the application processor 130.

The first camera module 110 may generate, store, and output first image data I1 based on a first camera control signal CS1 generated from the application processor 130. The second camera module 120 may generate, store, and output second image data I2 based on a second camera control signal CS2 generated from the application processor 130. The first and second image data I1 and I2 may be transferred to the application processor 130 through serial camera interfaces independently and simultaneously. The first camera module 110 and the second camera module 120 will be more fully described below.

The application processor 130 may control overall operations of the components of the image sensing system 100. The application processor 130 may perform various image processing based on the image data I1 and I2 generated from the first and second camera modules 110 and 120. The application processor 130 may include a first image signal processor 131, a second image signal processor 132, an image generator 133, a memory controller 134, and a first memory 135.

The first image signal processor 131 may perform various operations for processing the first image data I1. The second image signal processor 132 may perform various operations for processing the second image data I2. For example, the first and second image signal processors 131 and 132 may perform noise reduction, correction, etc., for the purpose of improving the quality of the first and second image data I1 and I2. In addition, the first and second image signal processors 131 and 132 may be used to perform various operations, such as depth measurement and object recognition, based on the first and second image data I1 and I2.

The image generator 133 may merge images processed by the first and second image signal processors 131 and 132. For example, the image generator 133 may improve the quality of an image by using a wide image generated based on the first image data I1 and a tele image generated based on the second image data I2. The image may be provided to various components, such as a display (not illustrated) included in an electronic device.

The memory controller 134 may control an operation of the first memory 135. The memory controller 134 may receive the first and second image data I1 and I2. The memory controller 134 may receive an image or data generated by the first and second image signal processors 131 and 132 or the image generator 133. The memory controller 134 may encode the received image or data, and may write the encoded result in the first memory 135. The memory controller 134 may read the image or data stored in the first memory 135, may decode the read image or data, and may transfer the decoded result to the first and second image signal processors 131 and 132 or the image generator 133. The memory controller 134 may transfer the read image or data to the second memory 150 or an external device (e.g., a display).

The first memory 135 may be configured to store the first and second image data I1 and I2, a result of processing the first and second image data I1 and I2, etc. For example, the first memory 135 may include a volatile memory such as a static random access memory (SRAM) or a dynamic random access memory (DRAM). For example, the first memory 135 may be a nonvolatile memory.

The power management integrated circuit 140 may provide a voltage to each of the components of the image sensing system 100. For example, the power management integrated circuit 140 may regulate voltage levels for driving the first camera module 110 and the second camera module 120 based on a power control signal provided from the application processor 130. The power management integrated circuit 140 may provide a first voltage signal CP1 to the first camera module 110 and may provide a second voltage signal CP2 to the second camera module 120.

The second memory 150 may be configured to store the first and second image data I1 and I2, a result of processing the first and second image data I1 and I2, etc. The second memory 150 may be configured to store application programs, an operating system (OS) image, and various kinds of data. For example, the second memory 150 may include a NAND-type flash memory. In another implementation, the second memory 150 may include a next-generation nonvolatile memory, such as a phase change RAM (PRAM), a magnetic RAM (MRAM), a resistive RAM (ReRAM), or a ferroelectric RAM (FRAM), or a NOR flash memory.

Figure 2:
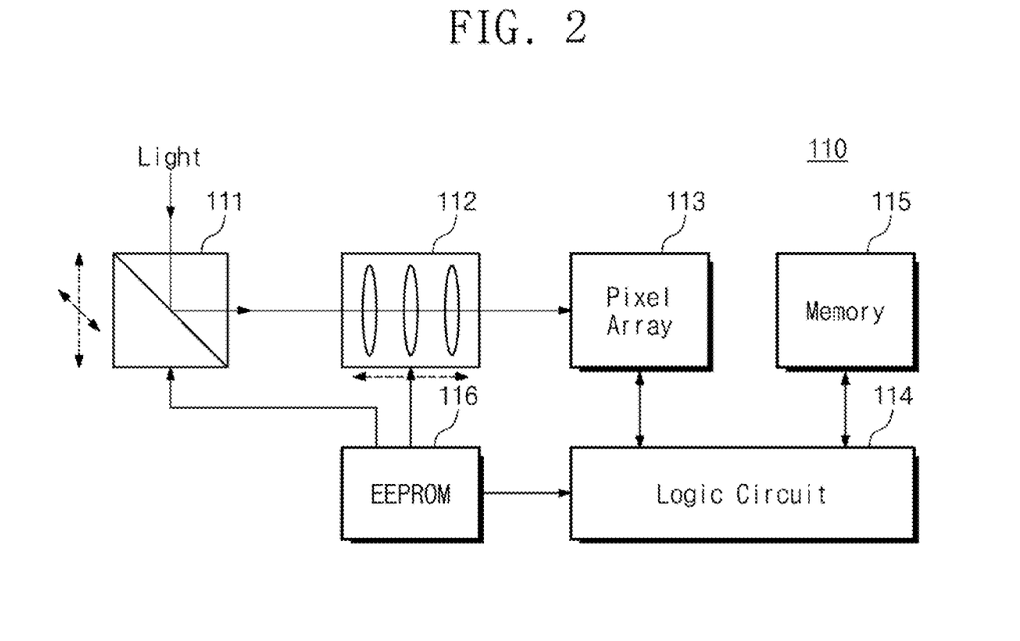
FIG. 2 is an example block diagram of a camera module of FIG. 1.

FIG. 2 is an example block diagram of a camera module 110 of FIG. 1. The camera module 110 of FIG. 2 may correspond to the first camera module 110 or the second camera module 120 of FIG. 1.

Referring to FIG. 2, the camera module 110 may include a reflecting element 111, a lens unit 112, a pixel array 113, a logic circuit 114, a memory 115, and an EEPROM 116. A structure of the camera module 110 of FIG. 2 may be varied. For example, the first and second camera modules 110 and 120 of FIG. 1 may not include the reflecting element 111 and may receive a light through the lens unit 112.

The reflecting element 111 may receive an external light and may provide the light to the lens unit 112. The reflecting element 111 may be an optical path folding element (OPFE) configured to output a light in a direction that is different from a direction in which the light is received. As such, a thickness of the camera module 110 may decrease, and a limitation of a focal length according to the thickness of the camera module 110 may decrease. For example, the reflecting element 111 may include a reflector for a change in a light path, and the reflector may move to prevent an image from being unstable due to the motion of the camera module 110. For example, the reflector may move in a direction that is perpendicular to a direction in which a light is output. In another implementation, a slope of the reflector may be adjusted. The reflecting element 111 may include a coil and a magnet.

The lens unit 112 may refract a light from the reflecting element 111 so as to be transferred to the pixel array 113. A focal length for image capture may be determined by the lens unit 112. At least a part of lenses included in the lens unit 112 may move to adjust a focal length (e.g., auto focus). For example, the lenses may move based on a direction in which a light is incident. The lens unit 112 may include an actuator.

The pixel array 113 may includes a plurality of pixels arranged two-dimensionally. Each of the plurality of pixels may sense a light transferred through the reflecting element 111 and the lens unit 112, and may convert the sensed light into a pixel signal that is an electrical signal. The pixel array 113 may generate an image signal being an analog signal including a plurality of pixel signals. The pixel array 113 may be controlled by pixel control signals provided from the logic circuit 114 and may generate an image signal. The image signal may be provided to the logic circuit 114.

The logic circuit 114 may select one or more of rows or lines of the pixels included in the pixel array 113. Pixels included in the selected line may generate pixel signals, and the pixel signals may be provided to the logic circuit 114. The logic circuit 114 may generate the pixel control signals corresponding to a selected row. For example, the pixel control signals may include control signals that are provided to various transistors of the pixels.

The logic circuit 114 may convert an image signal that is an analog signal to image data that is a digital signal. The logic circuit 114 may receive pixel signals generated from a selected line in parallel, and may convert the received pixel signals into digital signals. The logic circuit 114 may perform various operations for converting an analog signal into a digital signal. For example, the logic circuit 114 may perform correlated double sampling (CDS) for the purpose of extracting an effective signal component.

In a write operation, the logic circuit 114 may output image data to the memory 115. The logic circuit 114 may encode image data so as to be appropriately written in the memory 115. The logic circuit 114 may select an area of the memory 115 for the write operation. The logic circuit 114 may generate a control signal for the write operation corresponding to the selected area.

In a read operation, the logic circuit 114 may receive the stored image data from the memory 115. The logic circuit 114 may decode the image data received from the memory 115 to generate image data. The logic circuit 114 may select an area of the memory 115 for the read operation. The logic circuit 114 may generate a control signal for the read operation corresponding to the selected area. The logic circuit 114 may provide an interface between the pixel array 113, the memory 115, and the application processor 130 of FIG. 1.

An image signal generated by the pixel array 113 may be converted into image data by the logic circuit 114, and the image data may be written in the memory 115 through the logic circuit 114. A period to convert image data and a write period of the memory 115 may at least partially overlap each other.

Data stored in the memory 115 may be read from the memory 115 through the logic circuit 114, and the read data may be transferred to the application processor 130. A read period of the memory 115 and a period to output data to the application processor 130 may at least partially overlap each other.

In a general operating mode, image data may be transferred to the application processor 130 through the memory 115; however, in an operating mode such as a low noise mode, image data may be directly transferred to the application processor 130 without passing through the memory 115.

The memory 115 may be provided with image data from the logic circuit 114 in the write operation. The memory 115 may include a memory cell array for storing image data. The memory 115 may further include a sense amplifier, and image data may be written in or read from the memory cell array through the sense amplifier. The memory 115 may be, for example, a dynamic random access memory (DRAM).

The pixel array 113, the logic circuit 114, and the memory 115 may be implemented in a merged multi-stack structure. In another implementation, the pixel array 113 and the logic circuit 114 may be merged in a multi-stack structure, and the memory 115 may be separately provided within the camera module 110.

The EEPROM 116 may be configured to store a variety of control data for operation of the camera module 110. The control data stored in the EEPROM 116 may be used for operations of the reflecting element 111, the lens unit 112, the image sensor, etc. For example, the control data may include data associated with an angle of rotation, a focal length, a phase difference, an auto focus characteristic, etc., of the camera module 110.

Figure 3:
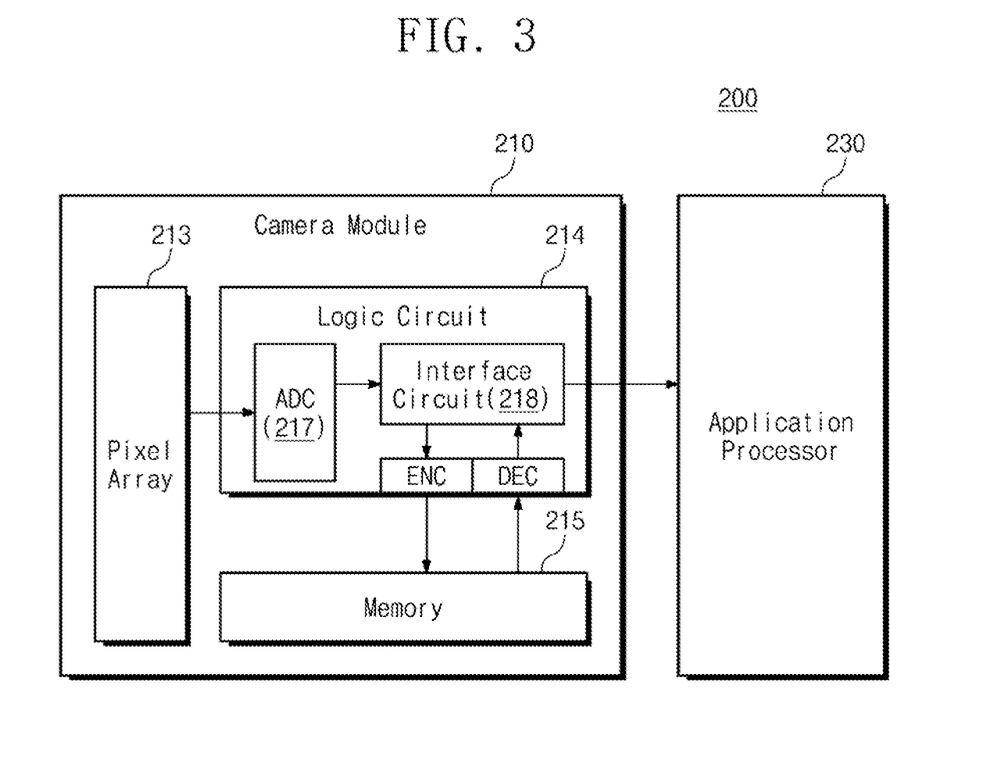
FIG. 3 is a block diagram for describing an operation of an image sensing system of FIG. 1 in detail.

FIG. 3 is a block diagram for describing an operation of an image sensing system of FIG. 1 in detail.

Referring to FIG. 3, an image sensing system 200 may include a camera module 210 and an application processor 230. The image sensing system 200 may corresponds to the image sensing system 100 of FIG. 1, the camera module 210 may correspond to the first camera module 110 and/or the second camera module 120 of FIG. 1, and the application processor 230 may correspond to the application processor 130 of FIG. 1.

The camera module 210 may include a pixel array 213, a logic circuit 214, and a memory 215. The pixel array 213, the logic circuit 214, and the memory 215 may correspond to the pixel array 113, the logic circuit 114, and the memory 115 of FIG. 2, respectively. The pixel array 213 may sense an external light to generate an image signal, and may output the generated image signal to the logic circuit 214.

The logic circuit 214 may include an analog-to-digital converter 217, an interface circuit 218, an encoder ENC, and a decoder DEC.

The analog-to-digital converter 217 may convert an image signal that is an analog signal to image data that is a digital signal. In a normal operating mode, the analog-to-digital converter 217 may receive an image signal in units of a line, and may convert the image signal into image data in units of a line. In a high-speed operating mode such as a slow motion mode, the analog-to-digital converter 217 may convert an image signal into image data at a higher speed than in the normal operating mode.

In a first operating mode, the interface circuit 218 may receive image data from the analog-to-digital converter 217 in units of a line, and may transfer the image data to the encoder ENC in units of a line. For example, the first operating mode may be the normal operating mode or the high-speed operating mode. The interface circuit 218 may align image data in units of a line. The image data may be encoded through the encoder ENC, and the encoded data may be stored in the memory 215. Data stored in the memory 215 may be decoded through the decoder DEC, and the decoded data may be transferred to the application processor 230 through the interface circuit 218.

The logic circuit 214 or the interface circuit 218 may include a physical layer for writing image data in the memory 215. The logic circuit 214 or the interface circuit 218 may include a physical layer for reading image data from the memory 215. The logic circuit 214 or the interface circuit 218 may include a physical layer for transferring image data to the application processor 230.

A period during which the analog-to-digital converter 217 converts an image signal into image data may overlap at least a portion of a period during which the image data are written in the memory 215. For example, an image signal corresponding to a first line of the pixel array 213 may be converted into image data, and after a given delay period, the image data may be written in the memory 215. When the image data corresponding to the first line are written in the memory 215, an image signal corresponding to a line (e.g., a second line) different from the first line may be converted into image data.

A write operation of image data may have an influence on digital conversion of an image signal. For example, a ramp signal for a digital conversion operation of the analog-to-digital converter 217 when the write operation is performed may be different from a ramp signal when the write operation is not performed. In this case, even though the same image signal is converted, image data written when the write operation is performed may be different from image data written when the write operation is not performed. To reduce a data difference for each line, the logic circuit 214 may write dummy data in the memory 215 during a period when the write operation and the conversion operation do not overlap each other. This will be more fully described below.

In a second operating mode, the interface circuit 218 may directly transfer image data received from the analog-todigital converter 217 to the application processor 230 without writing the image data in the memory 215. For example, the second operating mode may be a low noise mode. In the low noise mode, the logic circuit 214 may not perform an image data encoding/decoding operation and may not perform the write operation having an influence on a digital conversion operation of an image signal, and thus, a noise to be provided to image data may decrease.

Figure 4:
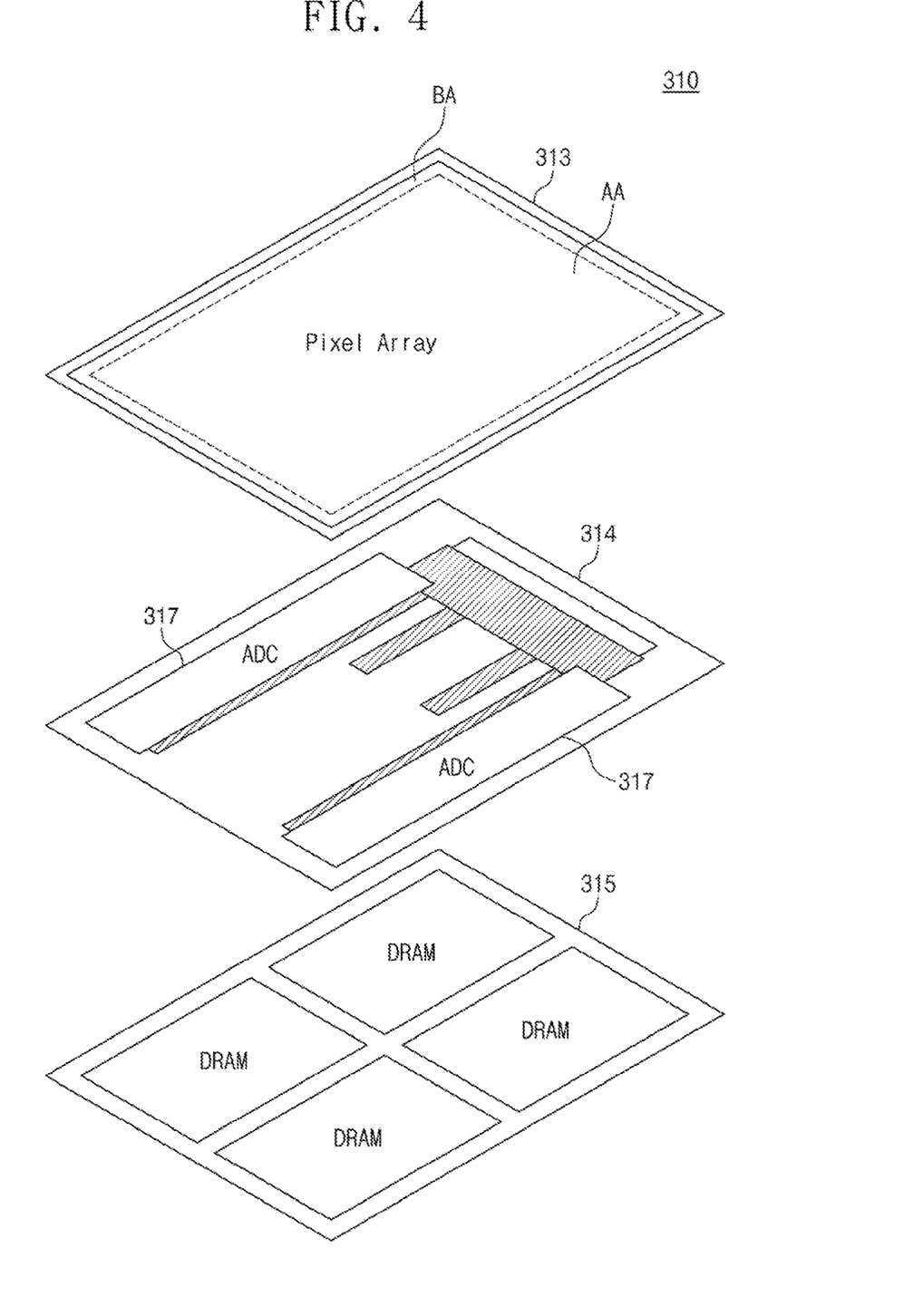
FIG. 4 is a view for describing an example structure of an image sensor described with reference to FIGS. 1 to 3.

FIG. 4 is a view for describing an example structure of an image sensor described with reference to FIGS. 1 to 3.

An image sensor 310 of FIG. 4 may be a portion of a camera module described with reference to FIGS. 1 to 3. Referring to FIG. 4, the image sensor 310 may include a pixel array 313, a logic circuit 314, and a memory 315.

The pixel array 313 may be implemented at a first substrate, the logic circuit 314 may be implemented at a second substrate, and the memory 315 may be implemented at a third substrate. The first to third substrates may be provided in a stacked structure. The image sensor 310 may be understood as one embodiment in which the image sensor 310 is implemented in a multi-stack structure in which a memory is merged. For example, the memory 315 may be present in a camera module as a separate component, and the pixel array 313 and the logic circuit 314 may be implemented in a stacked structure.

The pixel array 313 may include an active area AA including active pixels and a black area BA including optical black pixels. The black area BA may be formed at a boundary of the active area AA.

The active pixels may generate an image signal based on a light received from the outside. Light from the outside is prevented from being incident onto the optical black pixels, and the optical black pixels may generate a black image signal. The black image signal generated from the black area BA may be used for calibration of image data. For example, the logic circuit 214 may reduce a dark signal and a noise of an image signal by subtracting the black image signal from the image signal corresponding to the active area AA.

The logic circuit 314 may be interposed between the pixel array 313 and the memory 315. The logic circuit 314 may include an analog-to-digital converter 317 for converting an image signal into image data. In addition, as described with reference to FIG. 3, the logic circuit 314 may include a physical layer or an interface circuit for an interface with the memory 315, an application processor, etc.

The memory 315 may include a DRAM. The memory 315 may store image data received from the logic circuit 314. The memory 315 may output the stored image data to the logic circuit 314.

Figure 5:
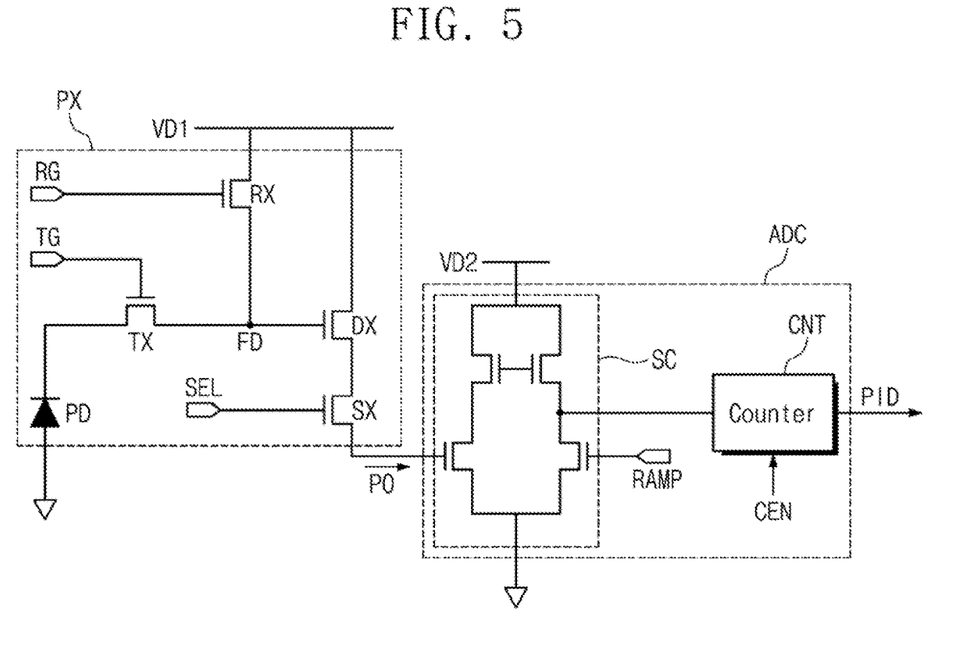
FIG. 5 is an example circuit diagram for describing an operation of a pixel and an analog-to-digital converter described with reference to FIGS. 2 to 4.

FIG. 5 is an example circuit diagram for describing an operation of a pixel and an analog-to-digital converter described with reference to FIGS. 2 to 4.

Referring to FIG. 5, a pixel PX may be understood as a pixel included in the pixel array 113, 213, or 313 of FIG. 2, 3, or 4. An analog-to-digital converter ADC may be understood as a portion of the analog-to-digital converter 217 or 317 of FIG. 3 or 4.

The pixel PX may include a photoelectric conversion element PD, a transfer transistor TX, a reset transistor RX, a selection transistor SX, and a driving transistor DX. A structure of the pixel PX may further, for example, include a storage transistor (not illustrated) that is connected between the transfer transistor TX and a floating diffusion area FD.

The photoelectric conversion element PD may generate and integrate charges depending on the amount of incident light or the intensity of incident light. For example, the photoelectric conversion element PD may be a photo diode, a photo transistor, a photo gate, a pinned photo diode (PPD), or a combination thereof.

The transfer transistor TX may transfer the generated and integrated charges from the photoelectric conversion element PD to the floating diffusion area FD. The transfer transistor TX may be connected between the photoelectric conversion element PD and the floating diffusion area FD. For example, the transfer transistor TX may be turned on or turned off by a transfer control signal TG. For example, the transfer control signal TG may be generated by the logic circuit described above. When the transfer transistor TX is turned on, the charges generated and integrated by the photoelectric conversion element PD may be transferred to the floating diffusion area FD. When the transfer transistor TX is turned off, the photoelectric conversion element PD may integrate charges.

The floating diffusion area FD may integrate the charges transferred from the photoelectric conversion element PD through the transfer transistor TX. The driving transistor DX may be controlled depending on the amount of charges integrated at the floating diffusion area FD.

The reset transistor RX may reset charges integrated at the floating diffusion area FD. The reset transistor RX may be connected between the floating diffusion area FD and a pixel power supply voltage VD1. The reset transistor RX may be turned on or turned off by a reset signal RG. For example, the reset signal RG may be generated by the logic circuit described above. When the reset transistor RX is turned on, the pixel power supply voltage VD1 may be transferred to the floating diffusion area FD. In this case, the charges integrated at the floating diffusion area FD may be discharged, and thus, the floating diffusion area FD may be reset.

The driving transistor DX may be a source follower buffer amplifier that generates a source-drain current in proportion to the amount of charges of the floating diffusion area FD, which are input to a gate terminal of the driving transistor DX. The driving transistor DX may amplify a potential change of the floating diffusion area FD and may output the amplified signal to a column line through the selection transistor SX. The signal thus output may be defined as a pixel signal PO.

The selection transistor SX may select the pixel PX to be read in units of a line. The selection transistor SX may be turned on or turned off by a selection signal SEL. For example, the selection signal SEL may be generated by the logic circuit described above. When the selection transistor SX is turned on, the pixel signal PO may be output to the column line.

The analog-to-digital converter ADC may include a sampling circuit SC and a counter CNT. The sampling circuit SC may output a signal, which is based on a difference between the pixel signal PO and a ramp signal RAMP, to the counter CNT. The ramp signal RAMP may have a slope when the counter CNT is enabled.

When enabled, the counter CNT may count a time when the pixel signal PO is greater than the ramp signal RAMP, and output pixel data PID. The pixel data PID may be included the image data described above. The counter CNT may be activated based on an enable signal CEN. During the period of activation of the counter CNT by the enable signal CEN, the ramp signal RAMP may have a decreasing slope, as illustrated in FIG. 6.

The counter CNT may perform a counting operation during a period when the pixel signal PO generated based on a reset operation of the pixel PX is greater than the ramp signal RAMP. A counting value according to the reset operation may be converted based on two's complement. The converted counting value may be a lower limit of the pixel data PID. Afterwards, the counter CNT may perform a counting operation during a period when the pixel signal PO generated based on charges integrated by photoelectric conversion of the pixel PX is greater than the ramp signal RAMP. The counter CNT may generate the pixel data PID corresponding to the pixel PX by performing counting during a corresponding period from the counting value converted according to the reset operation.

Figure 6:
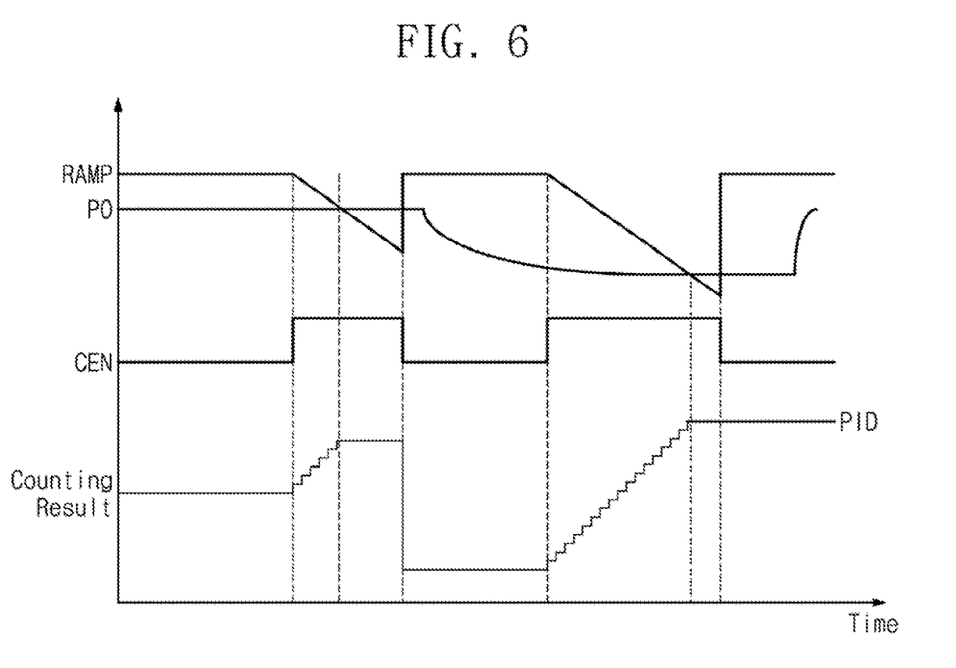
FIG. 6 is a timing diagram for describing an operation of an analog-to-digital converter of FIG. 5.

FIG. 6 is a timing diagram for describing an operation of an analog-to-digital converter of FIG. 5.

FIG. 6 illustrates the pixel signal PO, the ramp signal RAMP, the enable signal CEN, and a counting result over time. The timing diagram of FIG. 6 corresponds to one horizontal period. For convenience of description, FIG. 6 will be described with reference to reference marks/numerals of FIG. 5.

The analog-to-digital converter ADC may generate a counting value according to a reset operation. As the reset transistor RX is turned on by the reset signal RG, the floating diffusion area FD may be reset. A level of the pixel signal PO may be determined by the reset floating diffusion area FD. The analog-to-digital converter ADC may perform a counting operation based on the pixel signal PO according to the reset operation. While the counter CNT is enabled by the enable signal CEN, the ramp signal RAMP may have a slope. The counter CNT may increase a counting value (or a counting result) while a level of the ramp signal RAMP is greater than the level of the pixel signal PO.

The counting result according to the reset operation may be converted based on two's complement. The counting result may be converted into a negative number, based on a bit precision. For example, a maximum value of a digital value expressible by using the counting result may be subtracted. As such, the converted counting value may be a minimum value of the pixel data PID, which is capable of being generated. According to the above operation, it may be possible to perform both processing of the pixel signal PO according to the reset operation and processing of the pixel signal PO according to the photoelectric conversion operation.

The analog-to-digital converter ADC may generate the pixel data PID by applying the pixel signal PO according to the photoelectric conversion operation to the pixel signal PO according to the reset operation. As the transfer transistor TX is turned on by the transfer control signal TG, charges may be integrated at the floating diffusion area FD. A level of the pixel signal PO may be determined by the integrated charges. For example, a level of the pixel signal PO may decrease depending on the amount of integrated charges.

The analog-to-digital converter ADC may perform a counting operation based on the pixel signal PO determined according to the integrated charges. While the counter CNT is enabled by the enable signal CEN, the ramp signal RAMP may have a slope. The counter CNT may increase a counting value while a level of the ramp signal RAMP is greater than the level of the pixel signal PO. As a result, a value of the pixel data PID according to the light received by the pixel PX may be determined.

As described above, when the analog-to-digital converter ADC generates image data including the pixel data PID, previously generated image data may be written in a memory. This write operation may have an influence on the ramp signal RAMP. For example, the ramp signal RAMP that is provided to the analog-to-digital converter ADC during a period when a write operation is performed may be different from the ramp signal RAMP that is provided to the analog-to-digital converter ADC during a period when a write operation is not performed. This difference between the ramp signals RAMP may cause an undesirable offset to occur in image data of a specific line.

The analog-to-digital converter ADC may process an image signal in units of a line. In the case where a write operation is not performed with regard to a specific line whereas a write operation is performed with regard to any other lines, an offset may occur in image data of the specific line. In this case, the quality of image may decrease. To reduce this offset, a write operation may be performed whenever a conversion operation is performed.

Figure 7:
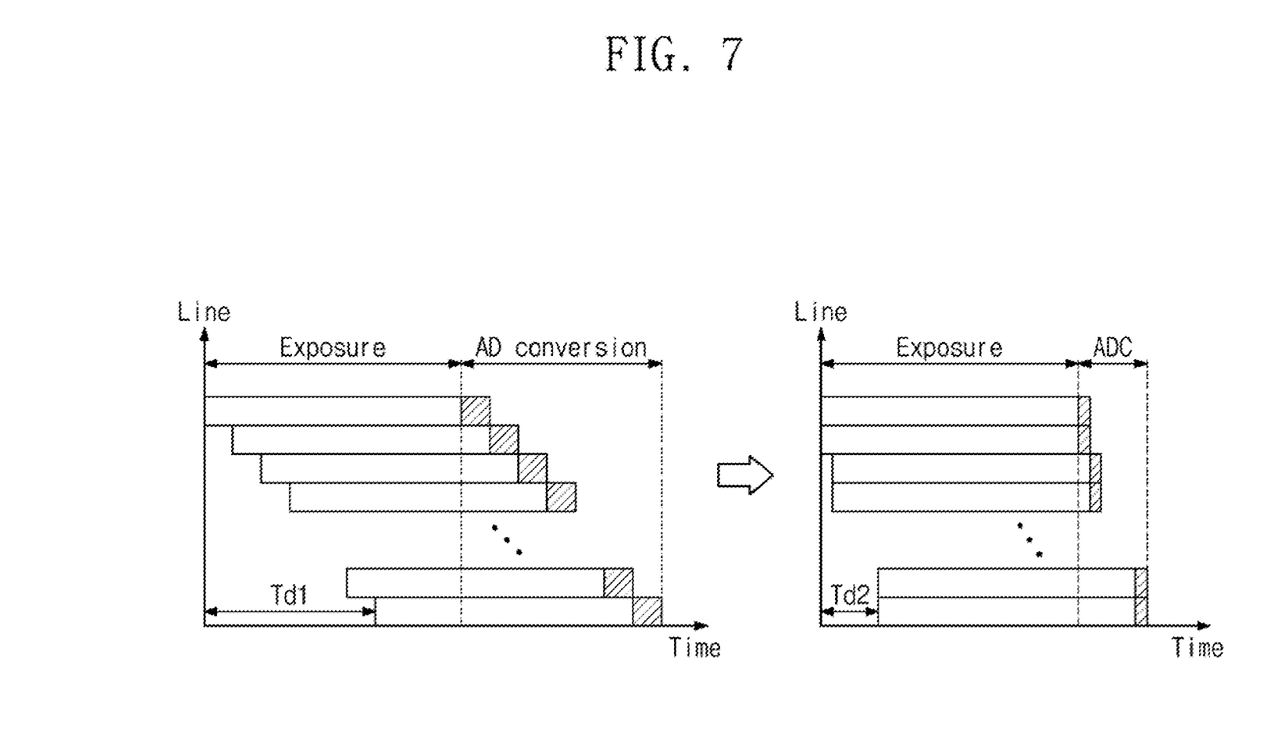
FIG. 7 is a timing diagram for describing an operation of an image sensor of FIGS. 1 to 6.

FIG. 7 is a timing diagram for describing an operation of an image sensor of FIGS. 1 to 6.

In FIG. 7, a horizontal axis is defined as a time, and a vertical axis is defined as lines of a pixel array. A pixel array may operate in units of a line under control of a logic circuit. For convenience of description, FIG. 7 will be described with reference to reference numerals/marks of FIG. 2.

An exposure period may sequentially progress from the first line to the last line. During the exposure period, pixels corresponding to each of the lines of the pixel array 113 may sense a light to generate an electrical signal. Each of the lines of the pixel array 113 may generate a line signal that is a portion of an image signal. After the exposure period, an analog-to-digital conversion (AD conversion or ADC) period may sequentially progress from the first line to the last line. Line signals that are sequentially output may be converted into line data that is a digital signal, based on a ramp signal. The line data may be a portion of the image data.

In the general operating mode, a time delay from the first line to the last line may be defined as a first delay time Td1. For example, in the general operating mode, a speed in which there are performed operations of receiving an image signal from the pixel array 113 and generating image data may be 30 fps (frame per second). However, in the case of capturing a quickly moving object, a time delay of each line in the general operating mode may cause distortion of an image (shutter distortion). For example, if the object moves quickly, the object may vary upon processing the first line.

In the high-speed operating mode, a time delay from the first line to the last line may be defined as a second delay time Td2. The second delay time Td2 may be shorter than the first delay time Td1. For example, in the high-speed operating mode, a plurality of lines may be exposed together, and analog-to-digital conversion may be together performed on the plurality of lines. A delay of an exposure of each of the lines may decrease. For example, in the high-speed operating mode, a speed at which image data are generated may be 120 fps. For example, in the case of a super-high-speed operating mode such as super-slow motion, a speed may increase up to 960 fps.

In the high-speed operating mode, the distortion of image may decrease, but the amount of time available to convert an image signal into image data may also decrease. That is, a time margin given to perform a counting operation by using a slope of a ramp signal may decrease. As described above, a ramp signal for analog-to-digital conversion (ADC) during a write operation may be different from a ramp signal for analog-to-digital conversion (ADC) when the write operation is not performed. As a time margin decreases, it may be difficult to perform a write operation during the remaining period, i.e., during a period other than a period when the ramp signal has a slope.

Figure 8:
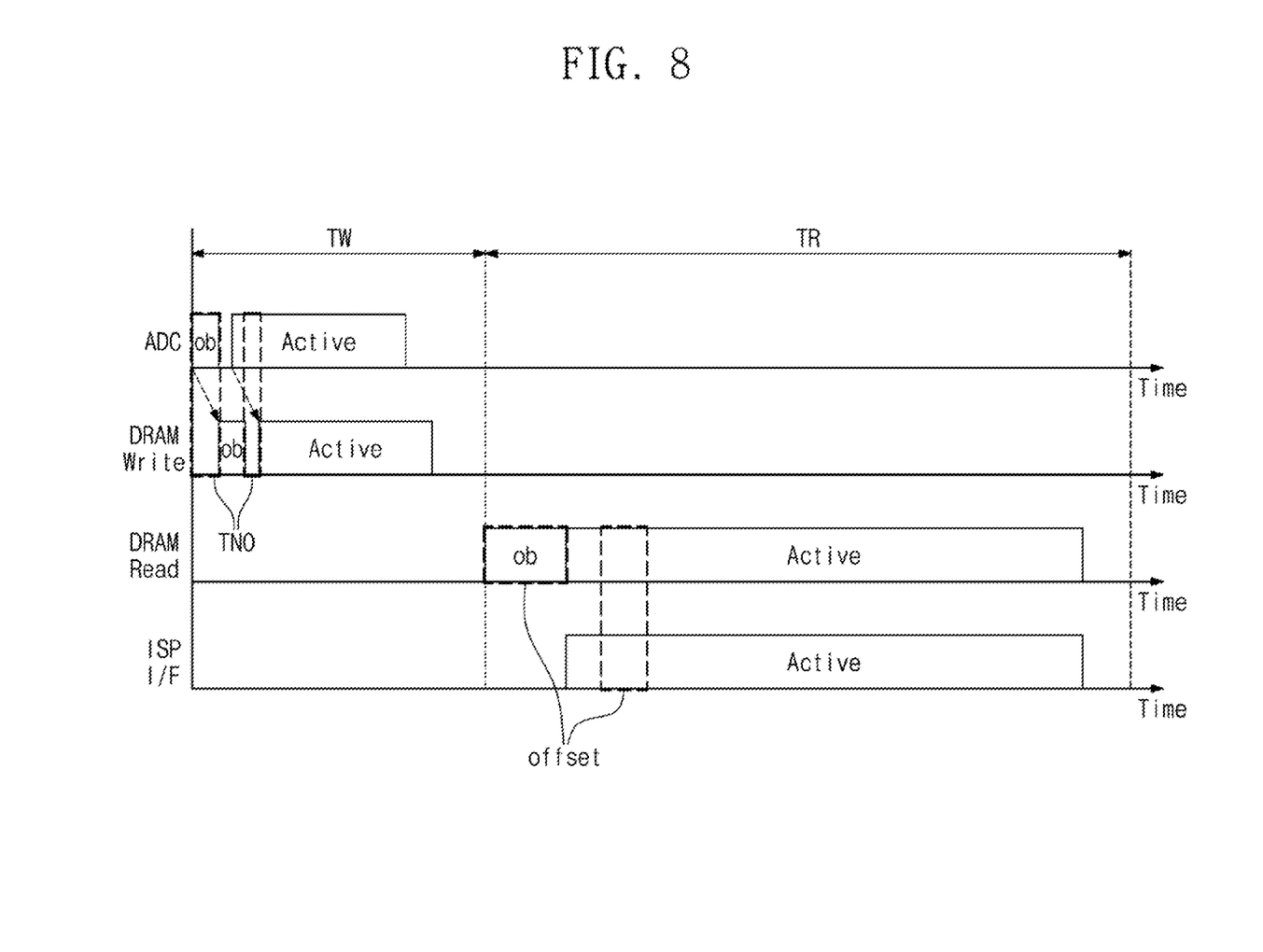
FIG. 8 is a timing diagram for describing an operation of a logic circuit of FIGS. 1 to 6.

FIG. 8 is a timing diagram for describing an operation of a logic circuit of FIGS. 1 to 6 as a reference example.

FIG. 8 illustrates a timing of an analog-to-digital conversion operation, a write operation, a read operation, and a processor interface operation over time. In an embodiment, the timing diagram of FIG. 8 corresponds to one frame. For convenience of description, FIG. 8 will be described with reference to reference numerals/marks of FIG. 2.

During a write period TW, the logic circuit 114 converts an image signal into image data.

For example, the logic circuit 114 may receive an image signal from optical black pixel lines and convert the received image signal into image data (ob) (the optical black pixel lines may include optical black pixels of the black area BA of FIG. 4). Afterwards, the logic circuit 114 may receive an image signal from active pixel lines and may convert the received image signal into image data (active) (the active pixel lines may include active pixels of the active area AA of FIG. 4).

An analog-to-digital conversion operation to generate image data (active) corresponding to the active pixel lines may be performed a given amount of time after an analog-to-digital conversion operation to generate the image data (ob) corresponding optical black pixel lines.

During the write period TW, the logic circuit 114 may write the image data in the memory 115 (DRAM Write). This write operation may be performed after a given delay time (indicated in FIG. 8 by a dashed arrow) from the analog-to-digital conversion (ADC) operation.

In performing the DRAM write of the write period TW, the logic circuit 114 may output the image data (ob) corresponding to the optical black pixel lines to the memory 115 and, subsequently, output the image data (active) corresponding to the active pixel lines to the memory 115.

During the write period TW, a first period when the analog-to-digital conversion (ADC) operation is performed and a second period when a write operation (DRAM Write) is performed may partially overlap each other.

The write period TW may also include one or more third periods TNO when the first period (when ADC is performed) and the second period (when DRAM Write is performed) do not overlap each other (non-overlapping period TNO). The third period (non-overlapping period) TNO may occur due to a time delay (indicated in FIG. 8 by a dashed arrow) between the analog-to-digital conversion (ADC) operation of data and the corresponding write operation (DRAM Write) of that data.

For example, a non-overlapping period TNO may be present before the commencement of the second period (e.g., before the DRAM Write operation is performed for the image data (ob) corresponding to the optical black pixel lines).

As another example, a non-overlapping period TNO may be present between a period when the black image data (ob) are written to the memory 115 and a subsequent period when active image data (active) are written to the memory 115.

As described above in connection with FIG. 7, a ramp signal for analog-to-digital conversion may have an influence on a write operation. As such, in FIG. 8, a ramp signal during the first period (ADC) overlapping the second period (DRAM Write) (i.e., during an overlapping period) may be different from a ramp signal during a non-overlapping period TNO. In this case, a counting operation performed on image data generated in the overlapping period may be based on a ramp signal that is different from a ramp signal for image data generated in the non-overlapping period TNO. As a result, an offset may occur in image signals (evident as, e.g., a row band noise in an image) that are obtained in an operation that includes performing analog-to-digital conversion in the non-overlapping period TNO. As a result, the quality of image may decrease.

During a read period TR in FIG. 8, the logic circuit 114 may read image data stored in the memory 115. The logic circuit 114 may output the read image data to the application processor 130 of FIG. 1, e.g., active image data may be output to the image signal processors 131 and 132. The image data may include the offset (e.g., a row band noise) described above. An operation for removing the offset will be described with reference to FIGS. 9 and 10.

In the high-speed operating mode, a write speed in the write period TW may be higher than a read speed in the read period TR. For example, in the high-speed operating mode, the write speed may be 120 fps to 960 fps, and the read speed may be 30 fps to 240 fps. To clearly sample an image, the amount of data may be increased, thus entailing an increase in analog-to-digital conversion speed. In an example embodiment, to accommodate a case where the amount of generated data may exceed the amount of data capable of being output to the image signal processors 131 and 132, the logic circuit 114 may store the generated image data in the memory 115 so that the camera module 110 may stably output the image data to the image signal processors 131 and 132.

Figure 9:
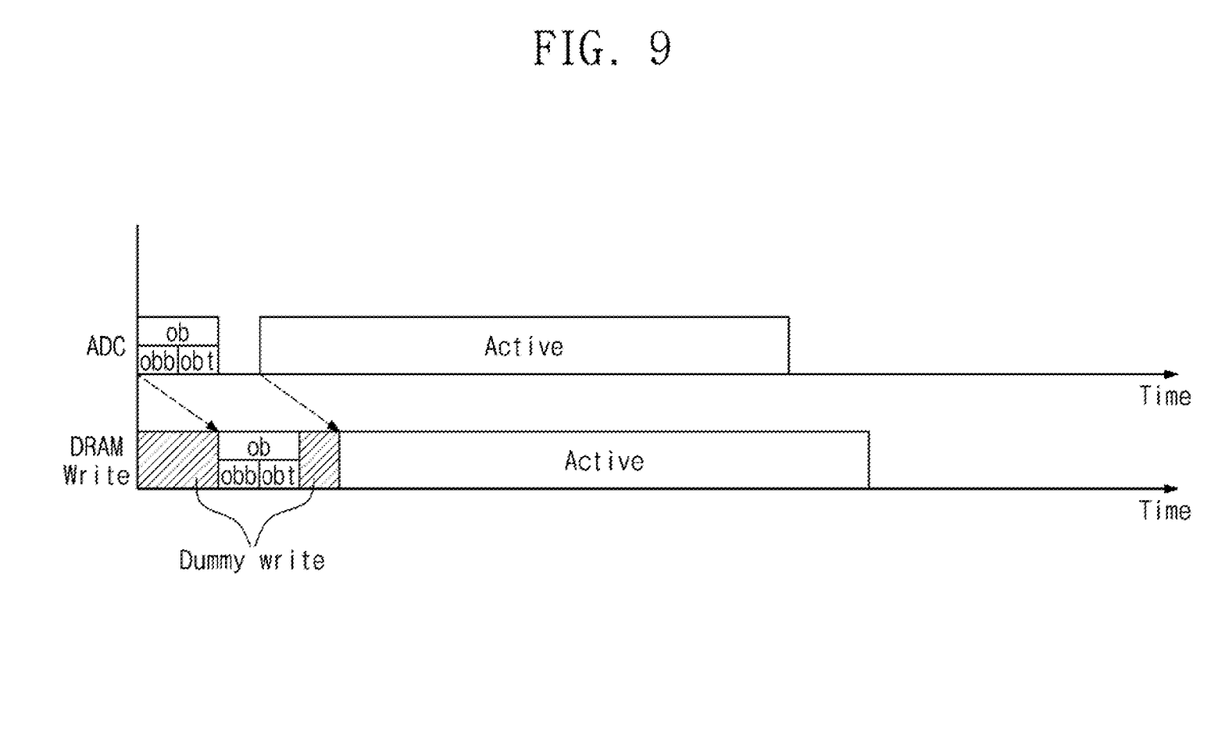
FIGS. 9 and 10 are timing diagrams for describing an offset removing operation of a logic circuit, which is described with reference to FIG. 8.
Figure 10:
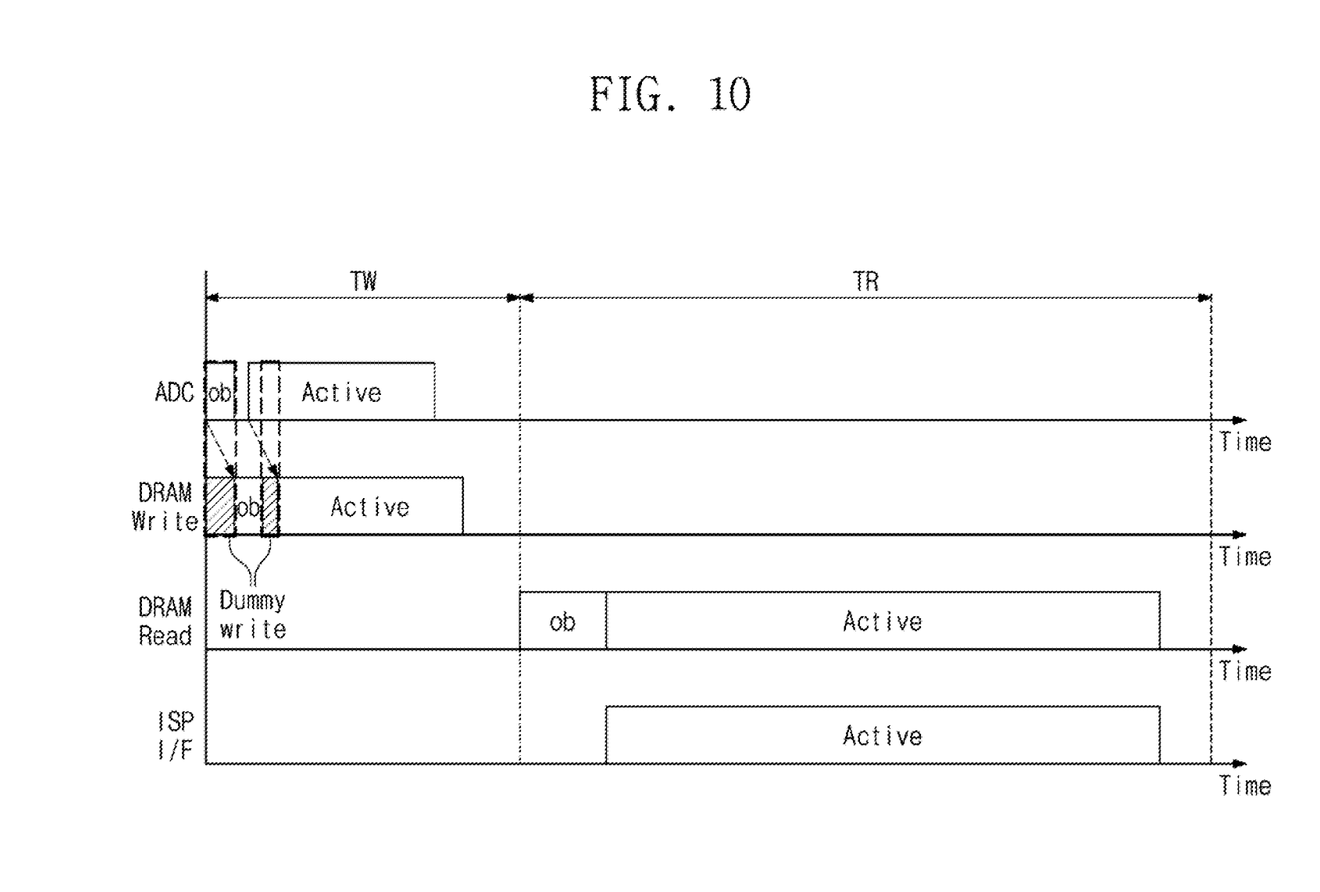

FIGS. 9 and 10 are timing diagrams for describing an offset removing operation of a logic circuit, which is described with reference to FIG. 8. FIG. 9 illustrates a timing of an analog-to-digital conversion operation and a write operation over time. FIG. 10 illustrates an operation of a logic circuit over time. For convenience of description, FIGS. 9 and 10 will be described with reference to reference numerals/marks of FIG. 2.

Referring to FIG. 9, during a first period, the logic circuit 114 may receive an image signal and may convert the received image signal into image data (ADC). For example, the logic circuit 114 may receive a black image signal from optical black pixel lines and may convert the black image signal into black image data (ob). As another example, the logic circuit 114 may generate black image data "obb" corresponding to bottom lines of the optical black pixels and may generate black image data "obt" corresponding to top lines of the optical black pixels. Subsequently, after a given amount of time (e.g., a time gap), the logic circuit 114 may receive an active image signal from active pixel lines and may convert (ADC) the active image signal into active image data (active).

During a second period, the logic circuit 114 may write the image data (ob, or obb,obt) in the memory 115 (DRAM Write). The start of the second period (during which the DRAM Write operation occurs) may be delayed with respect to the start of the first period (during which the ADC operation occurs), although a portion of the second period (during which the DRAM Write operation occurs) may overlap the first period (during which the ADC operation occurs).

During the second period, the logic circuit 114 may output the black image data (ob, or obb, obt) to the memory 115, and, after a given amount of time, the logic circuit 114 may output the active image data (active) to the memory 115.

As described above, a ramp signal for analog-to-digital conversion (ADC) during a write operation may be different from a ramp signal for analog-to-digital conversion (ADC) when the write operation is not performed. Thus, in the present example embodiment, a write operation may be extended using dummy data. For example, the logic circuit 114 may write dummy data in the memory 115 during a part of the first period that does not overlap the second period.

A period when dummy data are written may be equal to the non-overlapping period TNO described with reference to FIG. 8. As such, at least dummy data or image data may be written in the memory 115 while the logic circuit 114 converts an image signal into image data. As a result, a ramp signal may have a uniform waveform throughout the analog-to-digital conversion operation. Accordingly, during the part of the first period that does not overlap the second period, an offset may not occur, and thus, the quality of image may be improved.

Referring to FIG. 10, as described with reference to FIG. 9, in the write period TW, dummy data may be written in the memory 115 during the part of the first period that does not overlap the second period. During the read operation TR, the logic circuit 114 may read image data stored in the memory 115. The logic circuit 214 may output the read image data to the application processor 130 or the image signal processors 131 and 132 of FIG. 1. As dummy data are written during the part of the first period that does not overlap the second period, image data that are output to the image signal processors 131 and 132 may not have an offset. Because the dummy data are used to reduce a noise in analog-to-digital conversion, in the read operation, the dummy data may not be read from the memory 115. The dummy data may not be output to the image signal processors 131 and 132.

By way of summation and review, an image sensor may process an image signal in units of a line of the pixel array. If a speed at which an image signal is processed for each line decreases, there may be an increased chance of a change of an object, which may be reflected to an image signal and causing the distortion of image. As such, there is a demand on processing an image signal at high speed. Adding a memory to an image sensor may allow for an increase in data processing speed. This may be implemented, for example, by stacking a pixel array, a logic circuit, and a memory on the image sensor.

As described above, embodiments to an image sensor for reducing a noise in an image and a camera module including the same.

An image sensor and a camera module including the same may reduce noise that is generated in the process of converting an analog image signal into a digital signal, thus improving the quality of image.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. An image sensor, comprising:
   a pixel array;
   a logic circuit configured to convert an image signal generated from the pixel array during a first period into image data; and
   a memory, wherein the image data are written in the memory during a second period, of which at least a portion overlaps the first period,
   wherein the logic circuit writes dummy data in the memory during a third period overlapping the first period and not overlapping the second period.

2. The image sensor as claimed in claim 1, wherein the image signal includes line signals respectively generated from lines of the pixel array, and
   wherein the logic circuit generates the image data including line data corresponding to each of the lines of the pixel array based on a ramp signal and the line signals.

3. The image sensor as claimed in claim 2, wherein the logic circuit writes the dummy data in the memory from a time when a line signal first output from the pixel array from among the line signals is converted into line data to a time when the converted line data are written in the memory.

4. The image sensor as claimed in claim 1, wherein, when line data of the image data are generated, the logic circuit writes line data generated before the line data of the image data in the memory or writes the dummy data in the memory.

5. The image sensor as claimed in claim 1, wherein the pixel array includes:
   active pixels configured to generate a first signal of the image signal based on a light received from an outside; and
   optical black pixels configured to generate a second signal of the image signal as the light is blocked, and
   wherein, during the first period, the logic circuit converts the first signal to generate first data of the image data and converts the second signal to generate second data of the image data.

6. The image sensor as claimed in claim 5, wherein the first period includes a fourth period when the first data are generated, and a fifth period when the second data are generated, and
   wherein the third period includes a sixth period before the second period, and a seventh period between the fourth period and the fifth period.

7. The image sensor as claimed in claim 6, wherein the fifth period is before the fourth period, the sixth period at least partially overlaps the fifth period, and the seventh period at least partially overlaps the fourth period.

8. The image sensor as claimed in claim 5, wherein, after the second period, the logic circuit reads the image data from the memory and outputs the first data to a processor.

9. The image sensor as claimed in claim 1, wherein the pixel array is formed at a first substrate, the logic circuit is formed at a second substrate, and the memory is formed at a third substrate facing the first substrate with the second substrate interposed therebetween.

10. An image sensor, comprising:
    a pixel array; and
    a logic circuit configured to convert an image signal generated from the pixel array into image data during a first period, to output the image data to a memory during a second period at least partially overlapping the first period, and to output dummy data to the memory during a part of the first period that does not overlap the second period.

11. The image sensor as claimed in claim 10, wherein the logic circuit includes:
    an analog-to-digital converter configured to convert the image signal to the image data; and
    an interface circuit configured to output the image data or the dummy data to the memory.

12. The image sensor as claimed in claim 10, wherein the logic circuit generates the image data based on the image signal and a ramp signal, and outputs at least the image data or the dummy data to the memory when the ramp signal has a slope.

13. The image sensor as claimed in claim 10, wherein the logic circuit outputs the image data or the dummy data to the memory during the first period, in a first mode, and
wherein the logic circuit blocks an output of the image data to the memory or outputs the image data to a processor, in a second mode.

14. The image sensor as claimed in claim 13, wherein a period when the image signal is converted into the image data in the first mode is shorter than a period when the image signal is converted into the image data in the second mode.

15. The image sensor as claimed in claim 10, wherein the logic circuit is interposed between the pixel array and the memory.

16. The image sensor as claimed in claim 10, wherein the pixel array is formed at a first substrate, the logic circuit is formed at a second substrate, and the first substrate is disposed on the second substrate.

17. The image sensor as claimed in claim 10, wherein the pixel array includes:
active pixels configured to generate a first signal of the image signal based on a light received from an outside; and
optical black pixels configured to generate a second signal of the image signal as the light is blocked, and
wherein, during the first period, the logic circuit converts the first signal to generate first data of the image data, converts the second signal to generate second data of the image data, and outputs the dummy data or the second data to the memory when the first data and the second data are generated.

18. The image sensor as claimed in claim 10, wherein, after the second period, the logic circuit receives the image data from the memory and outputs the received image data to a processor.

19. A camera module, comprising:
a lens configured to transfer an external light;
a pixel array configured to generate an image signal based on the transferred light;
a logic circuit configured to convert the image signal into image data during a first period and to output the image data during a second period; and
a memory configured to store the output image data during the second period, in a first mode,
wherein, in the first mode, the logic circuit outputs the image data to the memory during the second period, and outputs dummy data to the memory during a third period overlapping the first period and not overlapping the second period, and
wherein, in a second mode, the logic circuit outputs the image data to an outside during the second period.

20. The camera module as claimed in claim 19, further comprising:
a reflecting element configured to receive the light from a first direction and to reflect the received light in a second direction so as to be output to the lens.

* * * * *